June 12, 1951 R. S. GRIFFIN 2,557,029
OPTICAL CENTERING GAUGE
Original Filed Jan. 16, 1942 3 Sheets-Sheet 1
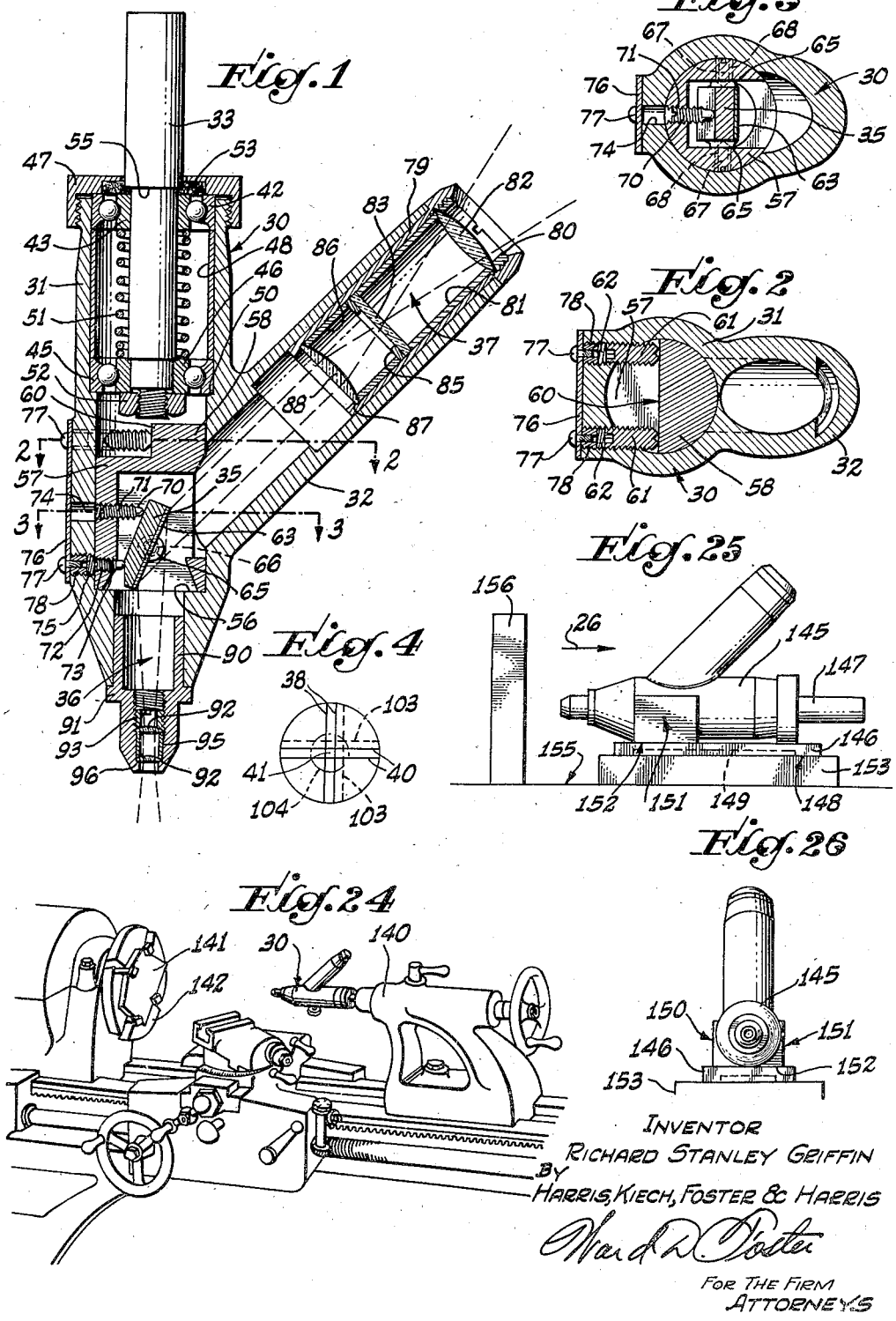
INVENTOR
RICHARD STANLEY GRIFFIN
BY
HARRIS, KIECH, FOSTER & HARRIS
FOR THE FIRM
ATTORNEYS June 12, 1951 R. S. GRIFFIN 2,557,029
OPTICAL CENTERING GAUGE
Original Filed Jan. 16, 1942 3 Sheets-Sheet 2
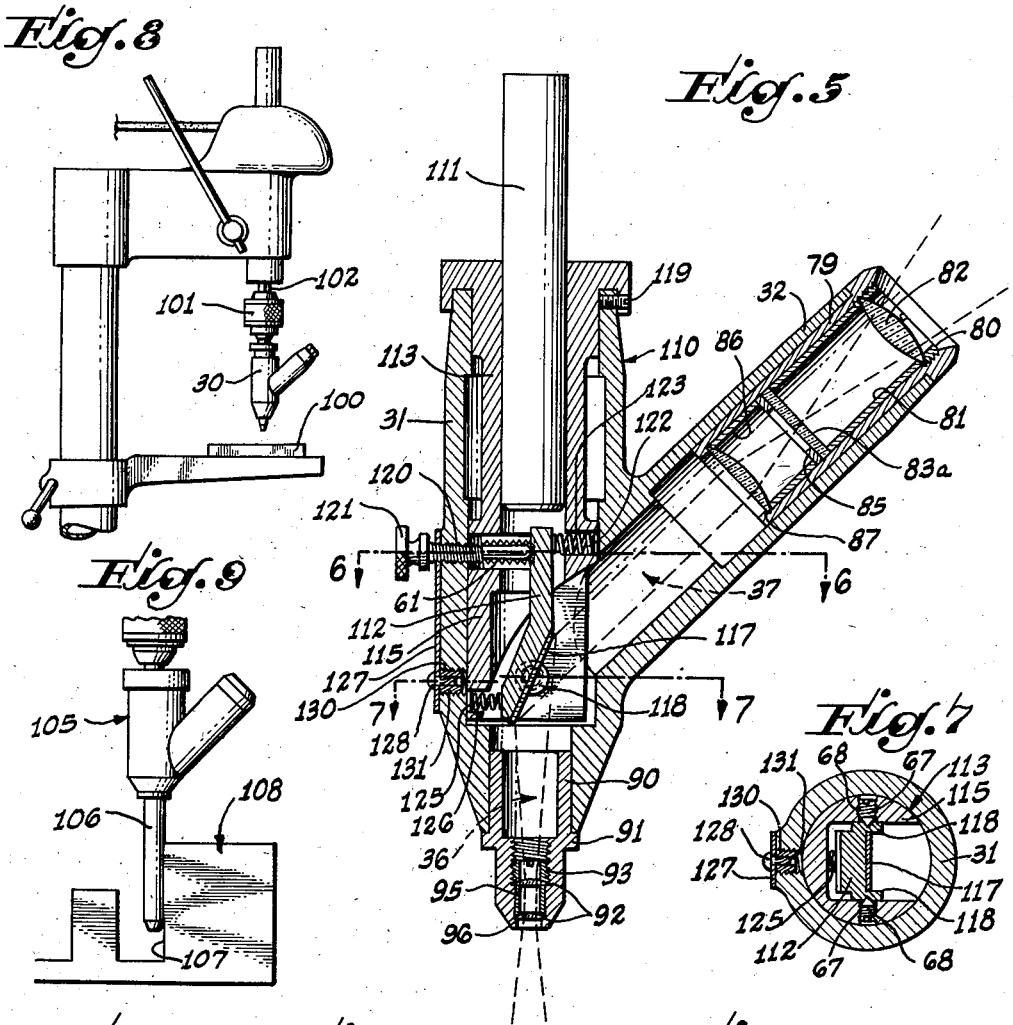
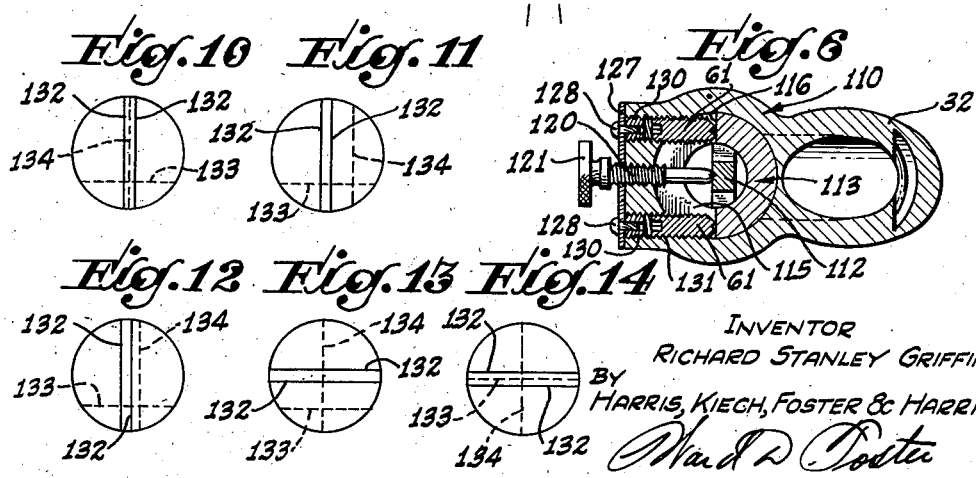
INVENTOR
RICHARD STANLEY GRIFFIN
BY
HARRIS, KIECH, FOSTER & HARRIS
FOR THE FIRM
ATTORNEYS June 12, 1951  R. S. GRIFFIN  2,557,029
OPTICAL CENTERING GAUGE
Original Filed Jan. 16, 1942  3 Sheets-Sheet 3
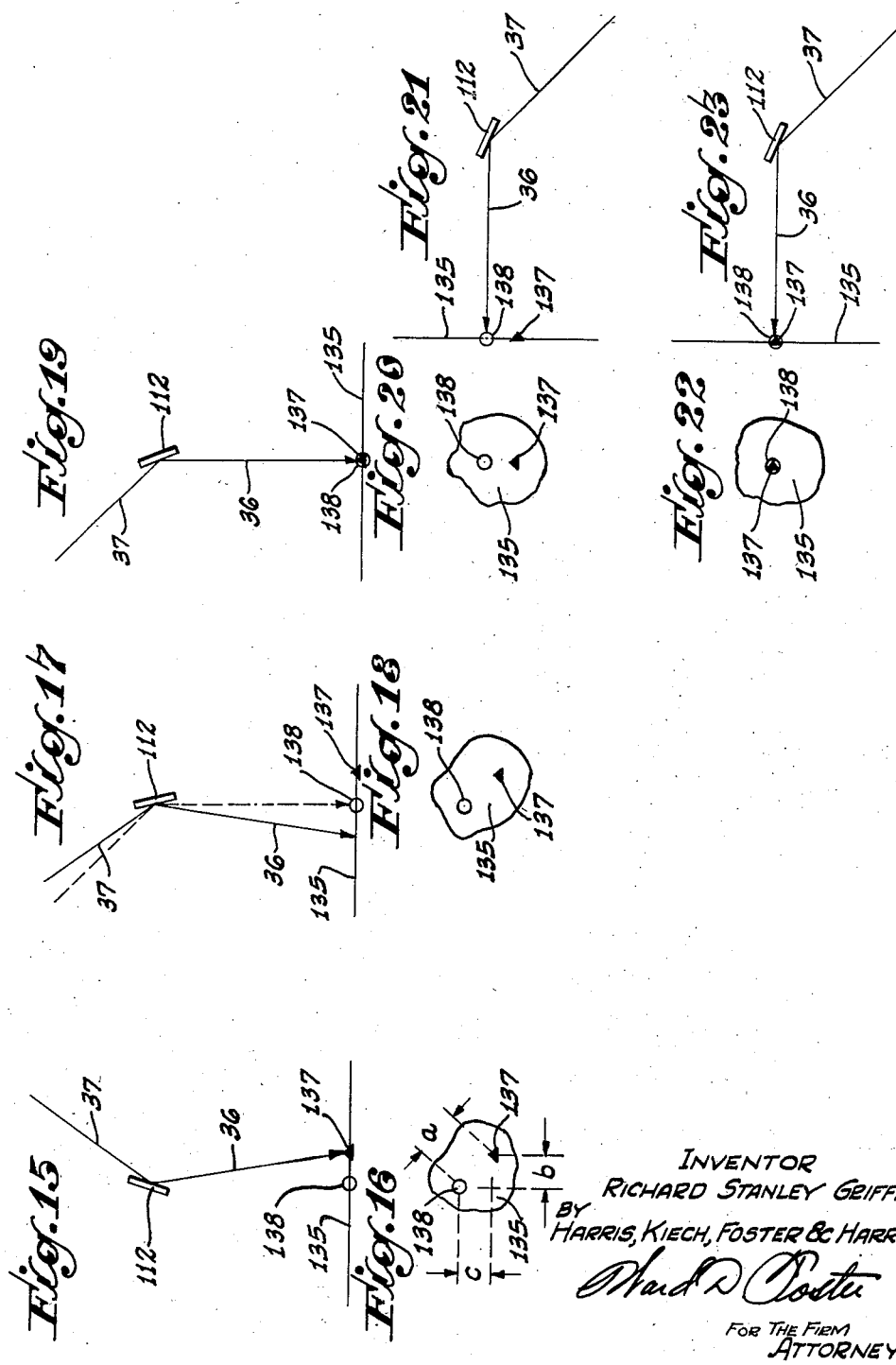

Patented June 12, 1951

2,557,029

UNITED STATES PATENT OFFICE 2,557,029

OPTICAL CENTERING GAUGE

Richard Stanley Griffin, Glendale, Calif.

Continuation of application Serial No. 427,002, January 16, 1942. This application March 24, 1945, Serial No. 584,573

8 Claims. (Cl. 88—39)

This application is a continuation of my copending application, Serial No. 427,002, filed January 16, 1942, entitled "Method and Means for Gage Operations in Machine Work and the Like," and now abandoned.

My invention relates to means pertaining to gages for machine work and similar purposes and is directed to an improved precision instrument of the optical type. The instrument may be employed for such operations as centering, truing, laying out, inspecting, testing, and measuring in machine shop practice and in other fields as well.

The general object of my invention is to provide a reliable gage that may be manipulated by an operator of only ordinary skill to produce exceedingly accurate results with great saving in time. It has been demonstrated that the invention may be practiced by an operator for the first time to achieve accuracy within .0001" plus or minus and that after a little experience the habitual accuracy of a careful operator may be within a tolerance of .00005".

A machine tool, such as a lathe, drill press, boring machine, and the like, has two holding means, one for a tool and the other for a work piece, one of the holding means rotating relative to the other about an operation axis. If one of the two holding means, usually the rotary holding means, is not aligned accurately, the cutting tool operates in a circular orbit about the operating axis relative to the work piece. This aberration is commonly termed "run-out." An important object of certain practices of my invention is to locate the true center or operation axis regardless of whatever run-out may be inherent in a machine.

In one of these practices it is an object of my invention to provide an optical gage adapted to be mounted on a rotary tool holder for use during rotation of the tool holder to ascertain the true center or operation axis regardless of runout. In this particular practice I have the novel object of providing an optical procedure that makes visible to the operator a circular orbit representing the run-out, the center of the circular orbit being the true center or the point at which the operation axis intersects the work piece.

In another practice of my invention for locating a true center regardless of run-out, it is my object to provide an optical gage that may be mounted either in a rotary holder or in a stationary holder for locating the true center while the machine is inactive. A further object here is to provide means for locating the true center without the necessity of ascertaining either the magnitude or the orientation of the inherent divergence that produces the run-out. A further object in this aspect of my invention is to provide a correcting means which may be employed to automatically resolve the unknown divergence into two components which are compensated in succession to locate the true center, there being no necessity for ascertaining the actual degree of the inherent divergence angle or the instant direction of the divergence.

A group of objects relating to the optical aspect of the invention includes the following: to provide an optical system whereby a line of sight at least approximately corresponding to the axis of a holding means may be observed longitudinally from a lateral point, i. e., to provide for a longitudinal line of sight that is bent to a lateral observation point to afford the observer the equivalent of sighting in a straight line down the axis of the holding means; to provide an accurate line of sight with an adequate field of vision; to provide a visual reference for indicating the location of the line of sight in the field of vision; to provide such a visual reference in the form of an image for observation with relation to a reference mark on a work piece in the field of vision; to provide such a visual reference for identifying the line of sight that is especially adapted for use with a special reference mark on a work piece; and to provide an optical system that inherently avoids any inaccuracy arising from apparent travel of the image of a mark on a work piece with change in location of the observer's eye at the eyepiece of the optical system. My object in one practice of the invention is to provide a line of sight in an optical system that may be varied for the purpose of performing a centering procedure regardless of run-out, and a further object is to provide a simple, reliable and easily adjustable means for causing such variation in the line of sight.

With reference to the physical structure of a gage of the present type, one of my important objects is to solve certain exceedingly difficult problems in precision manufacture, my solution being characterized by the concept of a construction that comprises largely parts manufactured to only ordinary tolerance but adapted for exceedingly precise adjustment in the course of assembly and adapted to maintain such adjustment permanently after assembly. A further object is to provide a standard or basic construction for the instrument that may be converted to various forms of the invention, which forms include what I term a "variable center scope," a "rotating center scope," and a "surface scope." These various forms will be described below.

The above and other objects and advantages of my invention will be apparent in the following detailed description taken with the accompanying drawings.

In the drawings, which are to be regarded as illustrative only,

Fig. 1 is a longitudinal sectional view of the form of my invention that I term the rotating center scope;

Fig. 2 is a transverse section taken on the line 2—2 of Fig. 1;

Fig. 3 is a similar section taken on the line 3—3 of Fig. 1;

Fig. 4 is a diagrammatic representation of the field of vision observed in the use of the instrument of Fig. 1;

Fig. 5 is a longitudinal sectional view of the form of the invention that I term the variable center scope;

Fig. 6 is a transverse section taken as indicated by the line 6—6 of Fig. 5;

Fig. 7 is a similar section taken as indicated by the line 7—7 of Fig. 5;

Fig. 8 is a side elevation on a reduced scale of the instrument of Fig. 5 mounted in a drill press;

Fig. 9 is a fragmentary view similar to Fig. 8 on an enlarged scale, showing one of my instruments with an extended optical objective for use with work pieces presenting certain difficulties;

Figs. 10 to 14 are diagrammatic views of a field of vision illustrating steps in a centering procedure performed with the variable center scope;

Figs. 15 to 23 are diagrams to further illustrate the space relationships involved in the series of steps;

Fig. 24 is a perspective view on a reduced scale of the variable center scope as set up for centering work in a lathe;

Fig. 25 is a side elevation of the form of my invention that I term the surface scope; and Fig. 26 is an end view of the same instrument taken as indicated by the arrow 26 of Fig. 25.

It is to be understood that, while the following description is directed specifically to instruments for machine shop practice, the principles of the invention are widely applicable to diverse purposes in various fields. The present disclosure will provide adequate guidance to those skilled in the art desiring to apply the invention wherever it may have utility.

The optical gage shown in Figs. 1 to 3 has a housing, generally designated 30, that includes a body portion 31 of cylindrical configuration and includes integral therewith a cylindrical portion 32 which may be termed the eyepiece of the instrument. The housing 30 is rotatably mounted on a coaxial stem or shank 33, whereby the instrument may be mounted in a chuck or the like. Inside the housing 30 is a suitable optical system, to be described later, the optical system including a light-deflecting means, generally designated 35, and providing for a line of sight having a first leg, indicated by the dotted line 36, substantially coaxial with the housing body 31 and a second leg, indicated by the dotted line 37, the second leg being preferably substantially coaxial with the cylindrical eyepiece 32. The instrument is further adapted to provide some visual reference means to indicate the location of the described line of sight. Preferably in the present device means is incorporated in the optical system to form on the field of vision an image (Fig. 4) comprising a first pair of parallel spaced lines 38 and a second pair of parallel spaced lines 40 perpendicular thereto, the four lines defining a small square 41 centrally of the field of vision. The line of sight is precisely at the center of the square 41.

It is apparent that the essential elements just described may be embodied in various forms and arrangements. In the particular construction indicated in Fig. 1, the housing 30 is rotatably mounted on the stem 33 by an upper ball bearing comprising an outer race 42 in cooperation with an inner race 43, and a lower ball bearing comprising an outer race 45 cooperating with an inner race 46. The two bearings are in the form of thrust bearings, and to preclude any play in the bearings they may be amply preloaded.

In the present arrangement a cap 47 is threaded onto the upper end of the housing body 31 to exert considerable inward pressure on the outer race 42, the outer race 42 pressing in turn against a spacer sleeve 48 that in turn crowds the outer race 45 against an annular shoulder 50 of the housing 30. It is contemplated that the spacer sleeve 48 will be made of metal sufficiently soft to yield in response to compression incidental to the screwing down of the cap 47. For preloading the inner races 43 and 46, I employ a suitable helical spring 51 in compression between the two races, the spring tending to compress the ball elements between the inner and outer race. As indicated in Fig. 1, the inner end of the stem 33 may be provided with a suitable retaining nut 52, and the stem may be surrounded by a suitable gasket 53 to serve as a dust seal at the cap 47. When the bearings are initially assembled on the stem 33, the spring 51 presses the inner race 46 against the retaining nut 52 and presses the inner race 46 against an annular shoulder 55 on the periphery of the stem, but, when the cap 47 is screwed down, the two inner races are forced toward each other.

Snugly journaled inside the housing body 31 below the two bearings and resting on an annular shoulder 56 of the housing is a block 57 of cylindrical configuration, having the function of supporting the previously mentioned light-deflecting means 35, the block being cut away, as indicated in Fig. 1, to provide light-transmitting communication along the previously mentioned line of sight. At the upper end of the block 57 is a semi-cylindrical portion 58 presenting a diametrical face 60 for cooperation with a pair of set screws 61 to adjustably fix the rotational position of the block. As best shown in Fig. 2, these two set screws are threaded into corresponding bores 62 in the wall of the housing body 31.

The light-deflecting means 35 may be either light-reflecting or light-refracting in various practices of the invention. I prefer the present arrangement in which the light-deflecting means 35 is a metal body having a highly polished mirror surface 63, the mirror body being adjustably mounted on the cylindrical block 57 for rotation about a transverse axis. As indicated in Figs. 1 and 3, the mirror body 35 may be formed with a pair of ears 65 providing pivot sockets 66 having a common axis in the plane of the mirror surface 63, the common axis lying substantially at the intersection or juncture of the axis corresponding to the dotted line 36 and the axis corresponding to the dotted line 37. As best shown in Fig. 3, two pointed set screws 67 mounted in suitable diametric bores 68 in the block 57 enter the two sockets 66 to support the mirror body for rotation about the described transverse axis.

For controlling the tilt of the mirror body 35 about the transverse axis of the two set screws 67, I thread an upper set screw 70 into an upper bore 71 in the block 57 and thread a lower set screw 72 into a lower bore 73 in the block, the two set screws impinging against the back surface of the mirror body 35 on opposite sides of the transverse axis. For access to the two set screws 70 and 72, I provide corresponding relatively large bores 74 and 75 in the wall of the housing body 31, the two housing bores being oversize to permit the two set screws 70 and 72 to be accessible over an ample range of rotation of adjustment on the part of the block 57.

The outstanding advantage of the described method of mounting the mirror body 35 is that the various elements involved may be initially assembled in only approximately correct positions and then may be conveniently and quickly adjusted to an exceedingly high degree of precision. Thus, after initial assembly, the device may be mounted in a suitable jig providing an accurately located target for observation through the eyepiece 32. While the initially assembled instrument is in the jig, the mirror body 35 is rotatably adjusted about the axis of the housing body 31 by means of the two set screws 61 acting on the diametric face 60 of the block 57 and is rotatably adjusted with respect to tilt about the transverse axis by the two set screws 70 and 72.

After complete adjustment is accomplished by sighting on a target, it would be found that the mirror surface 63 is rotated to a plane perpendicular to the plane defined by the two dotted lines 36 and 37 and is tilted to a position making equal angles with the two dotted lines. It has been found in practice that the described elements may be so designed that the transverse axis on which the mirror body 35 is pivoted may lie a substantial distance out of the plane of the mirror surface 63, since it is the final position of the mirror surface, rather than the axis about which the mirror is adjusted to reach the final position, that is important in the actual use of the device.

After precision assembly is accomplished with the various set screws tight to maintain precision, a name plate may be employed to conceal bores in the housing body 31 and preclude access to the set screws. Figs. 1 to 3 show a name plate 76 retained by headed pins 77, the headed pins being driven into threaded bushings 78 in the two bores 62 and in the bore 75.

A suitable optical system for service in the construction described to this point may be provided as follows. The outer end of the eyepiece 32 is equipped with a suitable cylindrical liner 79, the liner being telescoped into the eyepiece with a forced fit. At the outer end of the liner 79 in confinement between a suitable bushing 80 and a spacing sleeve 81 is an outer lens 82. This outer lens 82 is a double convex lens having a focal length of 1.003", an outside diameter of .685", and a thickness through the axial center of .187". The inner end of the spacing sleeve 81 lies substantially in the focal plane of the lens 82 and abuts a flat reticle 83. The reticle 83 is provided on its upper surface with suitable cross-hairs to form the previously mentioned pattern of intersecting lines 38 and 40 in the field of vision shown in Fig. 4. Underlying the recticle 83 is a stop or aperture plate 85 having an inner diameter of $\frac{7}{16}$", the stop being supported by a second spacer sleeve 86. Confined between the lower end of the spacer sleeve 86 and an inner annular shoulder 87 in the liner 79 is a plano convex lens having a focal length of 1.997", a diameter of .685", and a thickness of .120."

To complete the optical system, a tubular objective 90 having a radial flange 91 is frictionally telescoped into the lower end of the housing body 31. The tubular objective 90 retains a doublet combination of two plano convex lenses having a focal length of .625", the spacing of the two lenses optical center to optical center being .295". In the particular construction shown, a bushing 93 presses the upper of these two lenses 92 against a spacer sleeve 95, and the spacer sleeve in turn presses the lower lens against an annular shoulder 96 formed in the tubular objective.

Fig. 8 illustrates by way of example how the described optical gage may be employed for properly positioning a work piece, generally designated 100, on a drill press, the drill press having a tool holding means in the form of a chuck 101 on a vertical spindle 102. Preparatory to the centering procedure, the desired location is indicated on the work piece by two lines intersecting each other perpendicularly. The two dotted lines 103 in Fig. 4 represent such reference marks on the work piece as an image in the field of vision provided by the above described optical system.

With the work piece 100 in approximately the desired position, the operator places the optical gage in the chuck 101, as shown in Fig. 8, and lowers the chuck to bring the optical gage into focus with the surface of the work piece. If the intersecting reference lines are not apparent, the work piece is shifted as necessary to bring them into the field of vision, but the operator need not place the reference marks in a position symmetrical with respect to the reference lines 38 and 40 of the optical system. Since the stem or shank 33 of the instrument is coaxial with the housing body 31 and with the first leg 36 of the line of sight, the small square 41 formed by the cross-hairs is symmetrical with the axis of the stem 33.

The operator starts the drill press, thereby causing the stem 33 to rotate with the chuck 101, and the operator meanwhile holds the instrument housing 30 against rotation and at the same time observes the field of vision through the instrument eyepiece. The line of sight represented by the small square 41 on the field of vision actually describes a circular orbit on the surface of the work piece, but since the field of vision constitutes a reference frame for observing relative movement between the field of vision and the work piece, the orbital movement of the field appears to the observer as orbital movement of the intersecting lines 103. In other words, the intersecting dotted lines 103 appear to move in a manner to clearly define a circle 104 in Fig. 4 representing the run-out involved, regardless of the origin of the run-out, and the operation axis is at the center of the circle 104. To place the work piece accurately for drilling a hole concentric to the reference mark on the work piece, it is merely necessary to shift the work piece until the circular orbit is concentric to the small square 41 of the optical system, as indicated in Fig. 4. The operator may then substitute a drill for the optical gage with complete assurance that the resultant bore will be accurately located.

The described optical system may provide a magnification of more or less than 40 magnitudes, and preferably the cross-hairs employed on the reticle 83 to form the image lines 38 and 40 are spaced apart approximately .002", the spacing being magnified by the optical system. One of the problems in a precision optical instrument of the present type is to avoid apparent shifting of images in the optical field incidental to slight changes in position of the observer's eye relative to the optical axis at the eyepiece of the instrument. Any such shift in the optical field causes corresponding inaccuracy in the centering procedure. One method of avoiding such image travel is to employ a very small stop aperture to limit the field of vision, but the operator may be forced to do considerable "hunting" to bring the reference mark on the work piece into the field of vision if the diameter of the field of vision is unduly restricted. An advantage of the described optical system is that it inherently minimizes such image travel and therefore permits using a field of ample diameter.

One feature of the invention is that it may be embodied in an optical gage, such as shown at 105 in Fig. 9, with a relatively long tubular objective 106 for centering the work piece with respect to reference marks at locations difficult of access. In Fig. 9 the desired center is close to a perpendicular face 107 of a work piece 108.

In some practices of the invention the gage is employed on machines known to be so accurately built as to have no inherent run-out. In such practices I may use a gage of the above construction with a non-rotary stem, the gage being employed with the machine idle instead of running.

Figs. 5 to 7 show the construction of an optical gage, generally designated 110, that I term a variable center scope. The instrument is in large part identical in construction with the previously described instrument of Figs. 1 to 3, corresponding numerals being employed to designate corresponding parts. The chief differences to be found in Fig. 5 are the substitution of a rigid non-rotating stem or shank 111 for the previously described stem 33 and the employment of a mirror body 112 that is normally subject to manual adjustment instead of being rigidly fixed after final assembly.

The stem 111 is driven with a forced fit into a tubular body 113 that is telescoped into the housing body 31. The lower portion 115 of the tubular body 113 corresponds in configuration and function to the block 57 of Fig. 1. As indicated in Fig. 6, this lower portion 115 is cut away to provide a diametrical face 116 that is abutted by the previously mentioned pair of spaced set screws 61. The two set screws 61 determine the rotary position of the tubular body 113 about the axis of the housing body 31, being adjusted to permanent positions when the instrument is assembled at the factory. A set screw 119 at the outer end of the tubular body 113 may be provided as a precaution to prevent rotation of the tubular body after assembly.

The mirror body 112 is of angular configuration with a polished mirror face 117 and is formed with a pair of ears 118 that correspond to the previously mentioned ears 65. The ears 118 are pivotally engaged by the previously mentioned pointed set screws 67 to permit the mirror to rotate about a transverse axis.

It is contemplated that manually operable means will be provided to vary the tilt of the mirror face 117, thereby to vary the direction of the first leg 36 of the line of sight provided by the optical system. In other words, instead of arranging for the leg 36 of the line of sight to be constantly coaxial with the housing body 31, it is intended that this portion of the line of sight be movable to various angles of divergence from the axis of the housing body 31. In the particular construction shown, the mirror body 112 may be continuously urged in a rotary direction against a trimming screw 120 having a knurled head 121 on the exterior of the instrument. Two small springs may be employed for this purpose, one spring 122 being seated in a bore 123 in the tubular body 113, and a second spring 125 being seated in a second and lower bore 126.

It will be noted that the trimming screw 120 corresponds to the upper set screw 70 in Fig. 1 but, unlike the set screw 70, is threaded into the wall of the housing body 31 instead of being threaded into the tubular body 113 on which the mirror is mounted. The second arrangement, however, is practical and makes it unnecessary to provide for lateral movement of the trimming screw when the mirror body 112 is adjusted about the vertical axis in the course of factory assembly.

The instrument may be provided with a name plate 127 to cover bores in the housing body 31, the plate being retained by headed pins 128 that are driven into bushings 130, the bushings being threaded into the two bores 62 shown in Fig. 6 and into a lower bore 131 that is required for installation of the lower spring 125.

In this form of the invention the same optical system as previously described is employed, except that the reticle 83a is provided with only a single pair of cross-hairs to extend across the field of vision, as indicated by the two parallel image lines 132 in Fig. 10. It is important to note that the cross-hairs are parallel to the transverse axis about which the mirror body 112 tilts, whereby any change in the angle of tilt of the mirror body about the transverse axis causes the line of sight 36 as well as the whole field of vision to shift in a direction perpendicular to the two image lines 132. A reference mark on the surface of a work piece to be observed in conjunction with the two cross-hairs consists as before of two lines perpendicular to each other intersecting at the desired work center. Fig. 10 shows a dotted line 133 and an intersecting dotted line 134 constituting such a reference mark on the surface of a work piece. The intersection of the two lines 133 and 134 may be termed the reference center on the work piece.

The optical gage 110 of Fig. 5 may be mounted in a drill press in the same manner as indicated in Fig. 8 to locate a reference mark on a work piece precisely on the operation axis of the drill press, regardless of any runout that may be inherent in the drill press and regardless of the cause of such run-out. The initial step in the centering procedure is to orient the pair of parallel image lines 132 either with line 133 or line 134 of the reference mark and then to maneuver that dotted line into a central position symmetrical with the two parallel lines. To accomplish this end, the work piece is moved to bring the reference mark into the field of vision. Precise orientation and centralization may involve slight axial rotation of the gage and perhaps slight adjustment of the trimming screw 120. Fig. 10 shows the two image lines 132 straddling the reference line 134 at the end of this step.

The reference line 133 may be regarded as representing a first dimension across the work piece, the reference line 134 representing a second dimension across the work piece rotated from the first dimension by less than 180°. In the present procedure correction for run-out is first made with reference to line 134, but the direction of relative movement is along the first dimension or line 133. Thereafter correction is made along the second dimension.

The second step in the centering procedure with the variable form of the optical gage is to rotate the gage 180°, and nearly always such rotation causes the line 134 to take a position in the field of vision spaced from the two lines 132, as shown in Fig. 11.

The operator then performs the third step, which consists of manipulating the trimming screw 120 to cause the two image lines 132 to shift toward the line 134 until the apparent distance in Fig. 11 between the center of the field and the line 134 is divided by half. The whole field of vision, of course, shifts with lateral movement of the lines 132 so that the reference mark rather than the optical lines 132 appears to the operator as making the relative movement, and the field of vision at the end of this step has the appearance indicated by Fig. 12.

In the step just described the line of sight is shifted relative to the reference mark on the work piece, the work piece being stationary. In the step that is next performed the line of sight remains stationary, and the operator shifts the work piece until the line 134 is again symmetrically straddled by the two lines 132, as indicated in Fig. 10. It is apparent that the spacing shown in Fig. 11 between the line 134 and the center of the field of vision is taken up by movement of the line of sight relative to the work piece and to an equal extent by movement of the work piece relative to the line of sight. At this point the operator may check the accuracy with which the last two steps have been performed by rotating the optical gage 180°, the test being that such rotation does not disturb the symmetrical arrangement shown in Fig. 10.

The operator may then take the next step of the centering procedure, which step consists of rotating the optical gage 90° to place the two lines 132 parallel with the line 133 of the reference mark, the field of vision then having the appearance indicated in Fig. 13. Adjustment up to this point has been along or in the direction of the dimension represented by the line 133, whereas the intention now is to provide correction along or in the direction of the dimension represented by the line 134. To make this final correction the operator shifts the work piece in a direction perpendicular to the instant direction of the optical lines 132 to change the field of vision from the appearance of Fig. 13 to the appearance of Fig. 14, thereby placing the intersection of the two lines 133 and 134 at precisely the center of the field of vision. The reference mark on the work piece is now precisely on the operation axis of the machine.

The geometrical principles involved in the above described steps of the centering procedure may be understood by referring to Figs. 15 to 23.

Fig. 15 shows diagrammatically a mirror body 112 and the line of sight having the two legs 36 and 37. The surface of a work piece is at 135, and a small triangle 137 represents a reference center or center of a reference mark on the work piece, while the small circle 138 represents the unknown location of the operation axis. Fig. 16 shows in plan the relationships that are shown in side elevation in Fig. 15. It will be noted that the discrepancy between the reference center 137 and the operation axis 138 amounts to the distance "a." Of course, the orientation of the reference center 137 with respect to the operation axis 138 and the magnitude of the discrepancy or run-out are unknown.

In the centering procedure it is not necessary to measure the distance "a" or to ascertain the orientation of the reference center, since the procedure automatically deals successively with two components of the run-out, thereby locating the operation axis by successively compensating for the two components. Fig. 16 shows a component "b" and a component "c," and it will be readily recognized that the relative magnitudes of these components for a given magnitude of run-out will vary with the orientation of the reference center 137.

Fig. 15 shows the line of sight 36 aligned with the reference center 137 and corresponds to Fig. 10 showing the field of vision at the end of the first step of the centering procedure.

When the instrument is rotated 180°, the line of sight 36 is swung to the position shown in solid lines in Fig. 17, the field of vision then being as shown in Fig. 11. As indicated in Fig. 18, this step in a centering procedure involves no change in the spatial relationship between the reference center 137 and the operation axis 138. When the trimming screw is manipulated to divide the spacing between the reference center and the operation axis, the line of sight 36 is shifted to the dotted line position of Fig. 17, the shifting being accomplished by tilting of the mirror body 112. This point in the procedure is represented by Fig. 12.

In the next step the operator shifts the work piece to change the field of vision from the appearance shown in Fig. 12 to the appearance shown in Fig. 10, thereby causing shift of the reference mark 137 relative to the operation axis 138 to eliminate the component "b." Fig. 19 shows the position of the line of sight 36 at this time, and Fig. 20 shows the corresponding spatial relationship of the reference center 137 to the operation axis 138.

In continuing the centering procedure, the operator now rotates the instrument 90°, as indicated by the fact that Fig. 21 is rotated on the drawing 90° from Fig. 19 about the operation axis 138 in Fig. 20. The diagram shows how the 90° rotation creates the spacing between the reference center 137 and the line of sight 138 that appears in the field of vision shown in Fig. 13. When the operator makes the final step of eliminating this distance by shifting the work piece, the reference center is moved into accurate coincidence with the operation axis, as may be understood by comparing Figs. 20 and 21 with Figs. 22 and 23. Obviously, the lines of the reference mark may intersect at other than an angle of 90°, and likewise the correction for run-out may be along non-perpendicular dimensions.

In the centering procedure just described with reference to the drill press shown in Fig. 8, the work piece is stationary, while the tool holder is adapted for rotation. The optical gage 110 may be employed equally well to center work in a machine in which the tool holder is normally stationary and the machine work is accomplished by rotating the work holder. Fig. 24, for example, shows an optical gage 110 of the present type mounted on the tailstock 140 of a lathe for the purpose of determining the correct location of a work piece 141 on the face plate 142 of the lathe. The centering procedure described above with reference to Figs. 10 to 14 and Figs. 15 to 23 is carried out to position the work piece 141 on the face plate 142, but relative rotation between the gage and the work piece first of 180° and later of 90° is accomplished by rotating the work piece only, the gage being stationary in the tailstock throughout the procedure.

Figs. 25 and 26 show an embodiment of the described gage in which a special gage housing 145 is provided with a unitary base 146 and a non-rotatable stem 147, the gage being in all other respects similar to the gage shown in Fig. 1. Preferably the base 146 has a marginal bottom or supporting face 148, the under side of the base being recessed as indicated by the dotted line 149. When the housing 145 is bored longitudinally in the course of manufacture, three faces are machined on the sides of the housing equidistant from the longitudinal axis of the housing. Two of these faces 150 and 151 are diametrically opposite each other to lie at the sides of the finished instrument, while the third face 152 provides the under surface to rest upon the base 146. The thickness of the base 146 may be such as to place the longitudinal axis of the housing 145 exactly one inch or some other distance from the supporting face 148 of the base. The required thickness of the base to provide this spacing may be readily ascertained by carefully measuring the distance between the two side faces 150 and 151, since half of that distance is the distance from the under face 152 of the housing to the axis of the housing. After the housing is properly mounted on a base, the optical system is accurately corrected by placing the instrument in a suitable jig and observing an accurately located target for guidance in final adjustment of the mirror body in the housing. In the completed instrument the optical axis or line of sight through the objective of the optical system will coincide with the longitudinal axis of the housing 145 and will be exactly parallel to and exactly one inch or some other distance from the lower surface of the base 146.

The instrument shown in Figs. 25 and 26 has many uses as a sighting device. Fig. 25, for example, shows the instrument resting on a gage block 153 to place the optical axis of the instrument a desired distance above a reference surface 155, the reference surface being accurately machined. If a work piece 156 is placed on the reference surface 155 in focus with the instrument, as shown in Fig. 25, the line of sight provided by the optical system of the instrument will visually indicate a point on the surface of the work piece 156 spaced above the reference surface by the same distance as the longitudinal axis of the instrument.

An important advantage of an optical gage of the type described herein is that measurements may be made relative to references other than actual reference marks on a work piece. Thus, the gage may be sighted for measuring or centering purposes on the edge of a work piece or on a contour of a work piece. The instrument may also be sighted on the edge or point of a cutting tool for centering or for measuring distances from the cutting tool in setting up work.

For example, the spacing between two cutters of a straddle mill may be determined by placing the instrument of Fig. 25 in a vise on the work table of the mill, sighting the instrument on the edge of one rotary cutter, shifting the work table a predetermined distance, and then sighting through the instrument for guidance in the positioning of a second cutting tool. Any of the described optical gages may be employed for such purposes as inspecting parts. For example, one of my gages may be rigidly sighted on a master piece in a jig, the master piece being then replaced by work pieces for optical checking.

Various forms of my invention described in specific detail herein for the purpose of disclosure and to illustrate the principles involved will suggest to those skilled in the art various changes and substitutions under my concept, and I reserve the right to all such departures from the disclosure that properly lie within the scope of my appended claims.

I claim as my invention:

1. In an optical gage, the combination of: a housing having a cylindrical main bore disposed axially therein, and having an eyepiece member extending laterally therefrom, said eyepiece member having an axial eyepiece bore therethrough intersecting said main bore; a lens system in said housing, including a first lens element at one end of said main bore, and a second lens element at the outer end of said eyepiece bore; a cylindrical supporting member in said main bore and axially aligned therewith and rotatable therein, said supporting member being positioned at the intersection of said bores and having a cut-away portion to provide a light path between said first and second lens elements; means for rotating said supporting member on the main axis of said main bore relative to said housing; a mirror pivotally supported in said cut-away portion of said supporting member so as to lie in said light path and rotatable on a mirror axis perpendicular to said main axis; and means for so rotating said mirror to a position in which it directs light from said first lens element to said second lens element along said light path.

2. In an optical gage, the combination of: a housing having a cylindrical main bore disposed axially therein, and having an eyepiece member extending laterally therefrom, said eyepiece member having an axial eyepiece bore therethrough intersecting said main bore; a lens system in said housing, including a first lens element at one end of said main bore, and a second lens element at the outer end of said eyepiece bore; a cylindrical supporting member in said main bore and axially aligned therewith and rotatable therein, said supporting member being positioned at the intersection of said bores and having a cut-away portion to provide a light path between said first and second lens elements; means for rotating said supporting member on the main axis of said main bore relative to said housing; a mirror pivotally supported in said cut-away portion of said supporting member so as to lie in said light path and rotatable on a mirror axis perpendicular to said main axis; means for so rotating said mirror to a position in which it directs light from said first lens element to said second lens element along said light path; and a supporting shank fixed against axial movement in said main bore in substantially axial alignment with said first lens element and projecting out of said housing.

3. A centering gage for mounting on a machine having a part turnable about an axis of rotation, said gage comprising: a body; means for attaching said body to said machine in approximate alignment with said axis; optical means carried by said body and providing a field of vision for establishing a line of sight having a first leg approximately axially aligned with the said axis of rotation and a second leg at an angle thereto, said optical means including a light-deflecting element at the juncture of said two legs; means supporting said light-deflecting element for rotation on said body about an axis transverse to the plane of said two legs; and means providing at least one reference line across said field of vision to indicate the location thereon of said line of sight, said reference line being substantially parallel with said transverse axis whereby rotation of said light-deflecting element causes apparent travel of the reference line in a direction substantially perpendicular to the reference line to compensate for run-out in a centering operation.

4. A centering gage of the character described, comprising: a housing having a longitudinal light opening and a lateral light opening; light-deflecting means mounted in said housing to divert light passing through said longitudinal opening towards said lateral opening for observation, whereby the field of vision through said longitudinal opening may be observed from one side of the housing; means supporting said light-deflecting means for rotation about a first axis transverse to said longitudinal light opening and further means supporting said supporting means in said housing for rotation about a second axis extending axially of the said longitudinal light opening.

5. In an optical gage, the combination of: a housing having a longitudinal light opening and a lateral light opening; light-deflecting means carried by said housing to divert light passing through said longitudinal opening toward said lateral opening for observation whereby the field of vision through said longitudinal opening may be observed from one side of said housing; indicating means in said housing providing a reference line in said field of vision; a supporting shank, and axially fixed means mounting said supporting shank on said housing for free rotation about the longitudinal axis of said housing while maintaining the axial positions of said shank and said housing constant during rotation, whereby said shank may support said housing for rotation about its longitudinal axis during operation of said gage.

6. A centering gage for mounting on a machine having a component revolvable about an axis of rotation, said gage comprising: a body; means for mounting said body on the machine in approximate alignment with said axis of rotation; optical means carried by said body for establishing a line of sight having a first leg approximately axially aligned with said axis of rotation and a second leg at an angle thereto, said optical means including a light deflecting element at the junction of said two legs; and means connecting said light deflecting element to said body for rotation about an axis normal to the plane of said two legs whereby to vary the angle between said legs.

7. A gage as set forth in claim 6 wherein said optical means includes indicating means defining a reference line normal to the plane of said two legs.

8. A centering gage for mounting on a first holding means of a machine for use in positioning a work piece relative to a second holding means of the machine, one of the holding means being revolvable about an axis of rotation passing through the other holding means, the combination of: a body; means carried by said body and connectible to the first holding means of the machine for mounting said body on the first holding means in approximate alignment with said axis of rotation; optical means carried by said body for establishing a line of sight having a first leg approximately coinciding with said axis of rotaton and having a second leg at an angle thereto, said optical means including a light deflecting element which is located at the junction of the two legs of said line of sight and which is rotatable relative to said body about an axis normal to the plane of the two legs, whereby to vary the angle between said legs; and adjusting means carried by said body for rotating said light deflecting element.

RICHARD STANLEY GRIFFIN.

REFERENCES CITED

The following references are of record in the file of this patent:

UNITED STATES PATENTS

| Number | Name | Date |
| --- | --- | --- |
| 1,233,176 | Brewster | July 10, 1917 |
| 1,267,844 | Brewster | May 28, 1918 |
| 1,371,964 | Yaggi | Mar. 15, 1921 |
| 1,520,245 | Humbrecht | Dec. 23, 1924 |
| 1,868,908 | Lindley | July 26, 1932 |
| 2,146,906 | Moller | Feb. 14, 1939 |
| 2,184,615 | Gunther | Dec. 26, 1939 |
| 2,202,222 | Moller | May 28, 1940 |

FOREIGN PATENTS

| Number | Country | Date |
| --- | --- | --- |
| 26,791 | Great Britain | of 1911 |
| 173,512 | Great Britain | Aug. 17, 1922 |
| 410,050 | Great Britain | May 10, 1934 |